United States Patent
Daniels et al.

(10) Patent No.: US 9,297,555 B2
(45) Date of Patent: Mar. 29, 2016

(54) ROOF VENT AND SOLAR WATER HEATER

(76) Inventors: Daniel Lee Daniels, Merritt Island, FL (US); Janet Ruth Daniels, Merritt Island, FL (US)

(*) Notice: Subject to any disclaimer, the term of this patent is extended or adjusted under 35 U.S.C. 154(b) by 656 days.

(21) Appl. No.: 13/339,452

(22) Filed: Dec. 29, 2011

(65) Prior Publication Data

US 2013/0167833 A1    Jul. 4, 2013

(51) Int. Cl.
| | |
|---|---|
| E04D 13/18 | (2014.01) |
| F24J 2/46 | (2006.01) |
| F24J 2/50 | (2006.01) |
| F24J 2/30 | (2006.01) |
| E04D 13/17 | (2006.01) |
| F24F 5/00 | (2006.01) |
| F24F 7/02 | (2006.01) |
| F24J 2/34 | (2006.01) |

(52) U.S. Cl.
CPC .................. F24J 2/30 (2013.01); E04D 13/174 (2013.01); F24F 5/0096 (2013.01); F24F 7/02 (2013.01); F24J 2/345 (2013.01); *Y02B 10/20* (2013.01); *Y02E 10/44* (2013.01)

(58) Field of Classification Search
CPC .............. F24J 2/30; F24J 2/045; F24J 2/266; F24J 2/268; F24F 7/02; F24F 5/0096; E04D 13/174
USPC .................................. 126/621, 623, 628, 643
See application file for complete search history.

(56) References Cited

U.S. PATENT DOCUMENTS

| | | | | |
|---|---|---|---|---|
| 2,214,183 | A * | 9/1940 | Seymour | E04D 13/17 454/365 |
| 2,579,662 | A * | 12/1951 | Gibson | E04D 13/174 454/365 |
| 4,227,515 | A * | 10/1980 | Jacob | F24D 11/003 126/592 |
| 4,418,685 | A * | 12/1983 | Frazier | E04D 13/174 126/623 |
| 5,647,915 | A * | 7/1997 | Zukerman | F24J 2/5203 136/251 |
| 5,706,618 | A * | 1/1998 | Pratt | E04D 13/174 454/364 |
| 8,740,678 | B2 * | 6/2014 | Railkar | E04D 13/174 454/341 |
| 2006/0052047 | A1 * | 3/2006 | Daniels, II | E04D 12/004 454/237 |
| 2007/0074754 | A1 * | 4/2007 | Farquhar | E04D 13/174 136/244 |
| 2009/0205803 | A1 * | 8/2009 | Ward | E04D 13/174 165/48.1 |
| 2010/0269343 | A1 * | 10/2010 | Ward | E04D 13/174 29/890.03 |
| 2013/0059524 | A1 * | 3/2013 | Henderson | E04D 13/174 454/365 |
| 2013/0074428 | A1 * | 3/2013 | Allen | E04D 13/17 52/173.3 |

* cited by examiner

*Primary Examiner* — William G Corboy

(57) ABSTRACT

A heat exchange device including a flexible hinge, a solar collector, a tank containing serpentine or coiled tubes which contain municipal water, wherein the tank contains thermal transmission vents designed for outflow of hot gasses from an attic, an insect screen, a precipitation drain and an attachment area is hereby disclosed.

6 Claims, 2 Drawing Sheets

ROOF VENT AND SOLAR WATER HEATER

The field of invention relates generally to roof systems and particularly to sloped roofs, which can incorporate a vent to exhaust hot attic gases. More particularly, the invention serves not only as an improved roof venting system but also acts as a solar water heater. The invention uses a method of utilizing escaping gases from the attic space to heat water from below in its tank, wherein the tank contains tubing containing water, as well as utilizing a system of baffles to exclude precipitation while also incorporating a clear panel as a top for the tank so that the sun can directly heat the water in the tank.

BACKGROUND OF THE INVENTION

A heat exchanger device installed as part of a roof system is hereby disclosed, wherein the device uses the hot gases escaping from the space below. The water in the tubing contained within the tank is also exposed to the heating effects of the sun from above. When installed the heat exchange device becomes an integral part of a roof system and can be painted to match the roof system so as to achieve a more aesthetically pleasing effect. The tank containing the water in the tubing is covered with clear panels which allow sunlight to directly come in contact with the tubing. The heat exchange device includes a venting system which is comprised of a system of baffles which block driven rain and precipitation as well as transmitting heat from hot gases escaping from the attic space below, and acts as an insect and rodent shield. The heat exchange device disclosed herein can both heat water and lower attic space ambient air temperature while also acting as a solar collector. Additionally, there is a plurality of holes in an attachment section of the heat exchange device to allow the device to be affixed to virtually any structure. Additionally, the heat exchange device includes a solar heater for water. The water is stored or circulated in the tubing to gain heat from gases escaping from the attic as well as allowing the water stored in its tubing to absorb heat from radiant solar energy from above. The effect is to raise the ambient temperature of the water stored in its tubing to reach a temperature closer to "usable" hot water and more efficiently lower the ambient temperature of the attic space below.

DETAILED DESCRIPTION OF THE INVENTION

Figure 1:
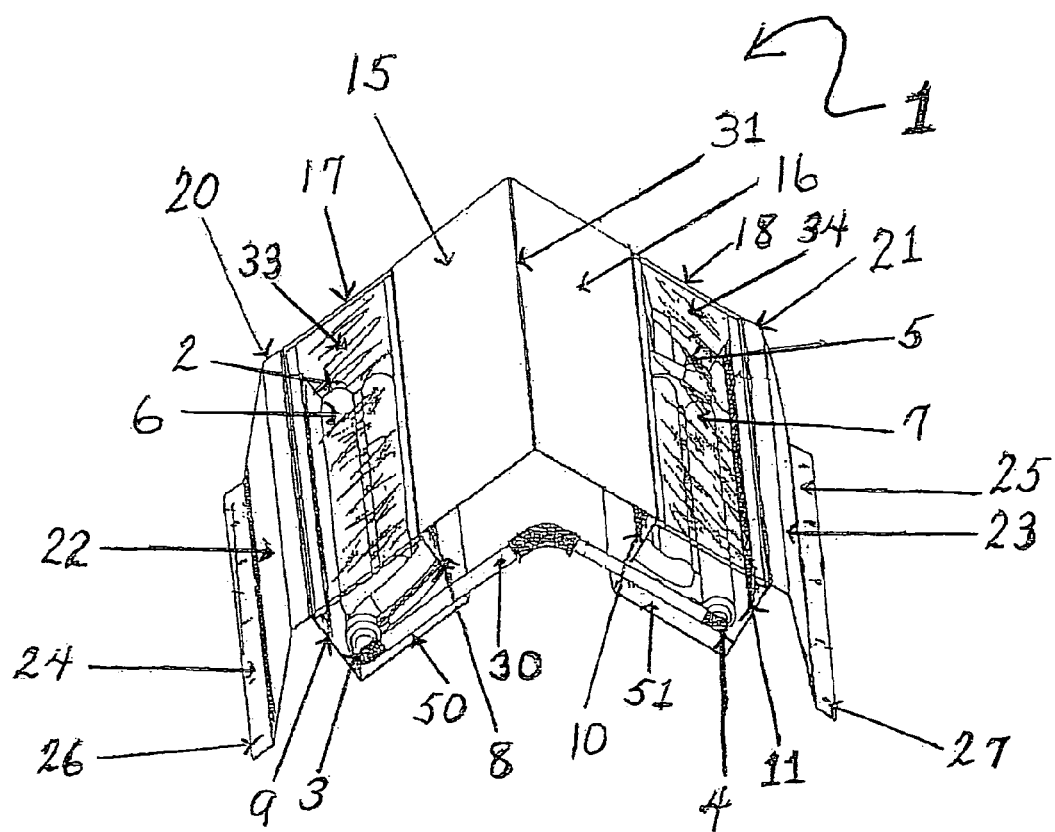
FIG. 1 relates to an embodiment of the present invention wherein a heat exchange device is a one-piece device with a flexible centralized hinge. The heat exchange device includes a crossover pipe to allow water to flow from a first side of the device in one direction to a second side of the device in a reverse direction.

The heat exchange device can be placed over a roof ridge vent The heat exchange device includes a tank, wherein the tank contains a piping or tubing. The heat exchange device is installed on a sloped roof having typical construction and utilizing a ridge vent. A roof deck is secured to a plurality of trusses to form a pitched roof assembly. A roof covering, usually shingles or metal, is installed to prevent precipitation from entering the structure below. The angle of the trusses (slope) creates a triangular void below (attic space). An open slot is provided to allow hot gases to escape. The heat exchange device utilizes these gasses to heat water stored in the tank. The tubing is fashioned in such a way as to form a serpentine pattern so as to slow the flow of water and expand the fluid cross-section thus maximizing the fluid's exposure to the sun's rays and contact with hot gases escaping from the attic space. Potable water from a municipal facility enters the tubing through the water inlet and circulates through the tubing where it picks up heat, crosses over through the fluid crossover pipe, to the tubing on the other side of the heat exchange device and travels in the opposite direction where it is discharged through the water outlet back into the attic space and into the primary water heating system.

Two or more heat exchange devices can be connected in series by connecting the water inlets and outlets one to another, by the use of a quick connect "push-on" connector such as a "shark bite", polysulfone connector or high temperature and pressure hose such as an automotive radiator hose and clamps, such as worm gear clamps. PEX tubing with crimp-on clamps may also be used. The water enters the water inlet and travels in one direction, i.e. east to west, through the series of heat exchange devices, crosses through a fluid crossover pipe and travels in the opposite direction, i.e. west to east, to a roof opening where it enters the series of heat exchange devices.

Further, the heat exchange device includes a series of thermal transmission vents which transmit gases from the attic space to the water in the tubing and then the gases are exhausted through an insect screen. The location of the insect screen as it relates to the thermal transmission vents allows hot gases to escape but precludes wind driven precipitation from entering the thermal gas transmission vents. Precipitation entering the insect screen leaves the heat exchange device through a drain area.

In an embodiment, the heat exchange device is positioned in an area which allows water in the device to be heated by hot gases escaping from the attic space. A transparent cover positioned over the tank containing tubing filled with water allows sunlight to heat the water stored in the tubing. An area in the tank below the tubing has a reflective coating to additionally enhance the effects of the sun's rays.

The heat exchange device includes a bendable, flexible area which allows the device to be positioned on sloped roofs with different pitches. Further, the heat exchange device includes an attachment area with a plurality of holes positioned directly above and in contact with the roof covering allowing the heat exchange device to be easily installed, repaired or removed and replaced in the event of the installation of a new roof membrane. The heat exchange device can be recycled and either reinstalled or relocated, removed for repairs or easily modified to facilitate different applications, renovations or different configurations. The exposed attachments (nails) and the ability of the "push-on" connectors to be removed, makes the heat exchange device easily and effortlessly reusable.

In an embodiment, the heat exchange device includes thermal transmission vents positioned below the clear panel. The clear panel, which can be a number of materials such as lightweight UV stabilized polycarbonate or tempered glass, allows sunlight to directly heat the water stored in the tubing contained within the tank.

In an embodiment, the heat exchange device includes a tank having a water inlet and a water outlet, wherein the water inlet and water outlet are operatively connected by a tubing. Further the tank includes a transparent cover at its top and a reflective surface at its bottom. The tank is operatively connected to a solar collector on one side and a precipitation baffle on the other side. Thermal transmission vents are located on both sides of the tank. The precipitation baffle is operatively connected to an insect screen. The insect screen is operatively connected to an attachment area. The attachment area includes a plurality of holes. The insect screen also serves as a vent for hot gas escaping from ridge roof vents above the attic. A flexible hinge connects one solar collector to an identical solar collector so that the heat exchange device can be placed over a roof ridge vent.

An end closure cover is installed at each end of the heat exchange device or series of heat exchange devices to cover and waterproof the open ends of the device. The end closure cover prevents vermin and insects from entering the device.

In an embodiment, the heat exchange device is a two-piece device employing a connecting means. The connecting means is operatively connected to the top of the solar collector, and includes a plurality of holes through which a nut and bolt or other means of attachment, can join two identical pieces together to form the completed heat exchange device. Each identical piece includes a connecting means operatively connected to a solar collector. Each solar collector is operatively attached to a tank having a water inlet and a water outlet, wherein the water inlet and water outlet are operatively connected by a tubing. Further the tank includes a transparent cover at its top and a reflective surface at its bottom. The tank is operatively connected a precipitation baffle on the other side. Thermal transmission vents are located on both sides of the tank. The precipitation baffle is operatively connected to an insect screen. The insect screen is operatively connected to an attachment area. The attachment area includes a plurality of holes. The two-piece device is joined together over a roof ridge vent.

The heat exchange device herein disclosed allows water from the municipal system to be raised to a higher temperature before entering the primary water heating system. The primary water heating system can be a gas water heater, an electric water heater, or the like. The device has a simplicity of design, no moving parts, an ease of fabrication and installation. The ridge roof vents can be of enhanced size to increase the thermal venting up to a range of about 200% to about 300%.

The heat exchange device can be fabricated from materials such as aluminum, copper, stainless steel, and galvanized sheet metal. In an alternative embodiment, the heat exchange device can be fabricated from plastics and resins. The heat exchange material is durable and lightweight, and can be readily transported and installed without the use of heavy equipment. The heat exchange device can be recycled and used with a second or even third roof system.

Heat exchange devices can be joined together in series in an unlimited number. They can be connected with available push-on connectors or glue. The unique venting system provided by the heat exchangers allows hot gasses to escape while prohibiting entrance of wind driven precipitation and insects.

The heat exchange device has an extremely low cross section and therefore can withstand hurricane force winds.

The heat exchange device herein disclosed can be employed to heat pools, spas or other bodies of water.

Referring to FIG. 1, a heat exchange device (1) is represented. The heat exchange device (1) includes a first solar collector (15) connected to a second solar collector (16) by a flexible hinge (31). The first solar collector (15) and the second solar collector are both extended to form a first tank (17) and a second tank (18) on each side of the flexible hinge. The first tank (17) includes a first water inlet (2) at one end and a first water outlet (3) at the other end. The second tank (18) includes a second water inlet (4) at one end and a second water outlet (5) at the other end. First water inlet (2) is operatively connected to first water outlet (3) by a first tubing (6), which tubing (6) can have a coiled shape or a serpentine shape. Second water inlet (4) is operatively connected to second water outlet (5) by a second tubing (7), which tubing (7) can have a coiled shape or a serpentine shape. First tank (17) has a bottom covered with a reflective surface (50). Second tank (18) has a bottom covered with a reflective surface (51). First tank (17) has a top which is a transparent cover (33). Second tank (18) has a top which is a transparent cover (34).

The first tank (17) includes a first thermal transmission vent (8) on one side and a second thermal transmission vent (9) on the other side. The second tank (18) includes a third thermal transmission vent (10) on one side and a fourth thermal transmission vent (11) on the other side. The thermal transmission vents (8), (9), (10) and (11) serve to allow hot gasses entrapped in the attic of the house structure to escape from the structure through the roof ridge vents and then through the heat exchange device (1).

First tank (17) is operatively attached to first insect screen (20). Second tank (18) is operatively attached to second insect screen (21). Insect screens prevent insects and vermin from entering the heat exchange device (1). Insect screens also allow hot gasses to escape from the attic through the heat exchange device (1). The first insect screen (20) is operatively attached to a first precipitation drain (22); and the second insect screen (21) is operatively attached to a second precipitation drain (23). The precipitation drains (22) and (23) allow for rain water, condensation and the like to be released from the heat exchange device (1).

The first precipitation drain (22) is operatively connected to a first attachment area (24). The second precipitation drain (23) is operatively connected to a second attachment area (25). The first attachment area (24) includes a first set of holes (26). The second attachment area includes a second set of holes (27). The sets of holes (26) and (27) included in the attachment areas can receive nails or the like for attachment of the heat exchange device (1) to the roof of the house structure.

A crossover pipe (30) is connected at one end to the first water outlet (3) and at the other end to the second water inlet (4).

Figure 2:
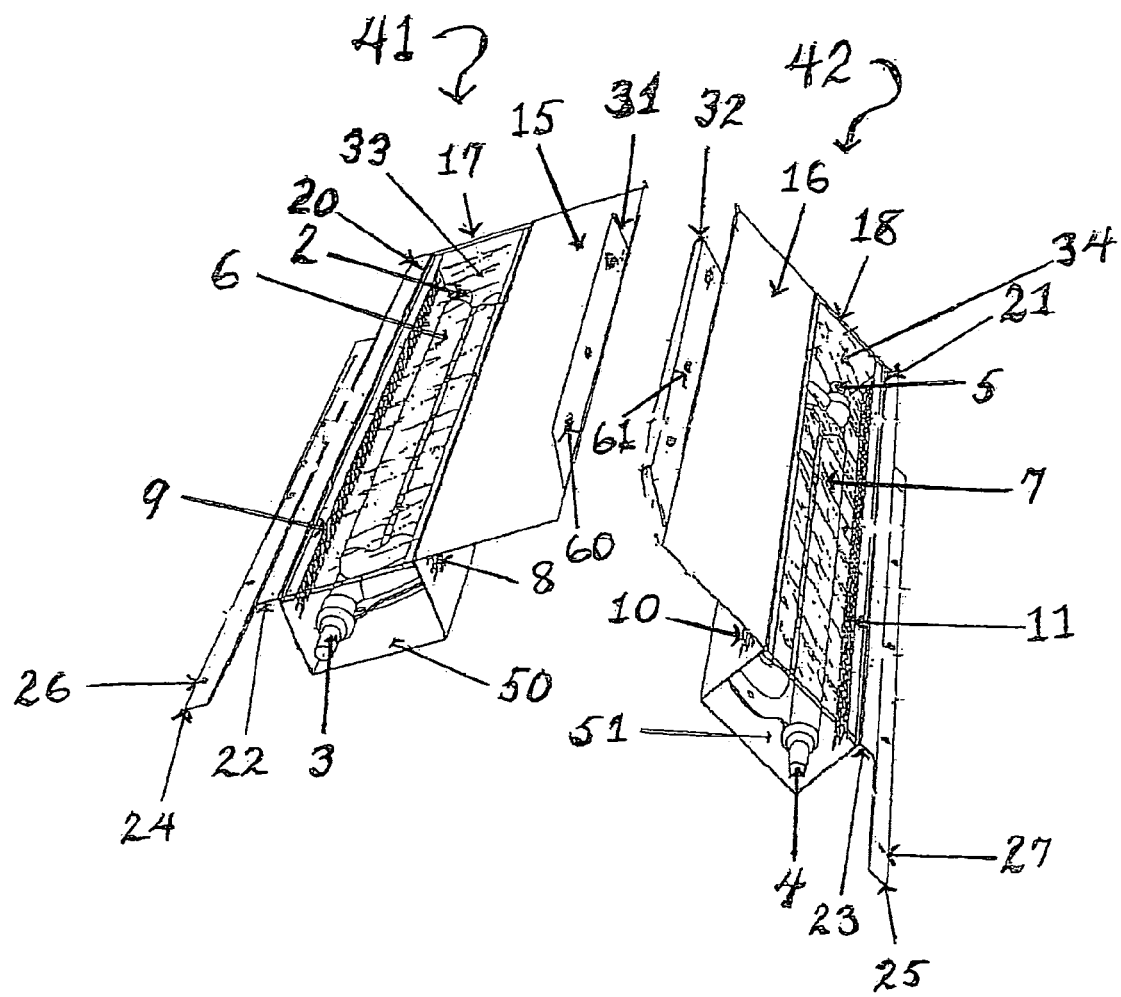
FIG. 2 relates to an embodiment of the present invention wherein the heat exchange device is a two-piece device employing a mounting flange on each piece.

Referring to FIG. 2, a two-piece device is represented, wherein the two-piece device employs mounting flanges (31) and (32) operatively connected to each of the pieces (40) and (41). The mounting flanges (31) and (32) serve as areas to join together piece (41) and piece (42). This allows installation on more obtuse roof slopes or more acute roof slopes. A first piece (40) includes a first mounting flange (31) operatively connected to a first solar collector (15). The first mounting flange includes a third set of holes (60), wherein the set of holes (60) can receive bolts (not shown) for attachment of the two pieces (41) and (42). The first solar collector (15) is extended to form a first tank (17), thus operatively connecting first solar collector (15) to first tank (17). The first tank (17) includes a first water inlet (2) at one end and a first water outlet (3) at the other end. First water inlet (2) is operatively connected to first water outlet (3) by a first tubing (6), which tubing (6) can have a coiled shape or a serpentine shape. First tank (17) has a bottom covered with a reflective surface (50). Second tank (18) has a bottom covered with a reflective surface (51). First tank (17) has a top which is a transparent cover (33). Second tank (18) has a top which is a transparent cover (34).

The first tank (17) includes a first thermal transmission vent (8) on one side and a second thermal transmission vent (9) on the other side. The thermal transmission vents (8) and (9)

allow hot gasses entrapped in the attic of the house structure to escape from the structure through the roof ridge vents (not shown).

First tank (17) is operatively attached to first insect screen (20). The insect screen (20) prevents insects and vermin from entering. The insect screen (20) also allows hot gasses to escape from the attic. The first insect screen (20) is operatively attached to a first precipitation drain (22). The precipitation drain (22) allows for rain water, condensation and the like to be released.

The first precipitation drain (22) is operatively connected to a first attachment area (24). The first attachment area (24) includes a first set of holes (26). The set of holes (26) included in the attachment areas can receive nails or the like for attachment to the roof of the house structure.

A crossover pipe (30) is connected at one end to the first water outlet (3) and at the other end to a second water inlet (4) found in second piece (41).

A second piece (41) includes a second mounting flange (32) operatively connected to a second solar collector (16). The second mounting flange (32) includes a fourth set of holes (61), wherein the set of holes (61) can receive bolts (not shown) for attachment of the two pieces (41) and (42). The second solar collector (16) is extended to form a second tank (18), thus operatively connecting second solar collector (13) to second tank (18). The second tank (18) includes a second water inlet (4) at one end and a second water outlet (5) at the other end. Second water inlet (4) is operatively connected to second water outlet (5) by a second tubing (7), which tubing (7) can have a coiled shape or a serpentine shape.

The second tank (18) includes a second thermal transmission vent (10) on one side and a second thermal transmission vent (11) on the other side. The thermal transmission vents (10) and (11) allow hot gasses entrapped in the attic of the house structure to escape from the structure through the roof ridge vents (not shown).

Second tank (18) is operatively attached to second insect screen (21). The insect screen (21) prevents insects and vermin from entering. The insect screen (21) also allows hot gasses to escape from the attic. The second insect screen (21) is operatively attached to a second precipitation drain (23). The precipitation drain (23) allows for rain water, condensation and the like to be released.

The second precipitation drain (25) is operatively connected to a second attachment area (25). The second attachment area (25) includes a second set of holes (27). The set of holes (27) included in the attachment areas can receive nails or the like for attachment to the roof of the house structure.

While the invention has been described by the various embodiments and descriptions, there is no intent to limit the inventive concept except within the metes and bounds of the following claims.

What is claimed:

1. An apparatus comprising:
    a tank, wherein the tank has a top and a bottom, a first end and a second end, and two sides;
    a water inlet located at the first end of the tank;
    a water outlet located at the second end of the tank;
    a tubing contained within the tank, wherein the tubing operatively connects the water inlet and water outlet;
    a transparent cover located at the top of the tank;
    a reflective surface located at the bottom of the tank;
    a solar collector operatively connected to a first side of the tank;
    a precipitation baffle operatively connected to a second side of the tank;
    a first thermal transmission vent located on the first side of the tank;
    a second thermal transmission vent located on the second side of the tank;
    an insect screen operatively connected to the precipitation baffle; and
    an attachment area operatively connected to the insect screen, wherein the attachment area comprises a plurality of holes.

2. The apparatus according to claim 1 wherein the tubing has a shape which is a member selected from the group consisting of a serpentine shape and a coiled shape.

3. A heat exchange device comprising two apparati operatively connected by a flexible hinge, wherein each apparatus comprises:
    a tank, wherein the tank has a top and a bottom, a first end and a second end, and two sides;
    a water inlet located at the first end of the tank;
    a water outlet located at the second end of the tank;
    a tubing contained within the tank, wherein the tubing operatively connects the water inlet and water outlet;
    a transparent cover located at the top of the tank;
    a reflective surface located at the bottom of the tank;
    a solar collector operatively connected to a first side of the tank;
    a precipitation baffle operatively connected to a second side of the tank;
    a first thermal transmission vent located on the first side of the tank;
    a second thermal transmission vent located on the second side of the tank;
    an insect screen operatively connected to the precipitation baffle; and
    an attachment area operatively connected to the insect screen, wherein the attachment area comprises a plurality of holes, and wherein the flexible hinge is operatively connected to the solar collector of each apparatus.

4. The heat exchange device according to claim 3 wherein the tubing has a shape which is a member selected from the group consisting of a serpentine shape and a coiled shape.

5. A heat exchange device comprising two apparati operatively connected by a mounting flange, wherein each apparatus comprises:
    a tank, wherein the tank has a top and a bottom, a first end and a second end, and two sides;
    a water inlet located at the first end of the tank;
    a water outlet located at the second end of the tank;
    a tubing contained within the tank, wherein the tubing operatively connects the water inlet and water outlet;
    a transparent cover located at the top of the tank;
    a reflective surface located at the bottom of the tank;
    a solar collector operatively connected to a first side of the tank;
    a precipitation baffle operatively connected to a second side of the tank;
    a first thermal transmission vent located on the first side of the tank;
    a second thermal transmission vent located on the second side of the tank;
    an insect screen operatively connected to the precipitation baffle; and
    an attachment area operatively connected to the insect screen, wherein the attachment area comprises a plurality of holes, and wherein the mounting flange is operatively connected to the solar collector of each apparatus.

6. The heat exchange device according to claim 5 wherein the tubing has a shape which is a member selected from the group consisting of a serpentine shape and a coiled shape.

\* \* \* \* \*